United States Patent
Conover et al.

(10) Patent No.: US 9,465,638 B2
(45) Date of Patent: Oct. 11, 2016

(54) MINIMIZING SCSI LIMITATIONS FOR VIRTUAL MACHINES

(71) Applicant: CloudVolumes Inc., Santa Clara, CA (US)

(72) Inventors: Matthew Conover, Mountain View, CA (US); Rajesh H. Parekh, Los Altos, CA (US); Jairam Choudhary, Sunnyvale, CA (US); Fei Huang, Fremont, CA (US); Gregory Tauglich, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 290 days.

(21) Appl. No.: 14/203,894

(22) Filed: Mar. 11, 2014

(65) Prior Publication Data

US 2014/0282538 A1    Sep. 18, 2014

Related U.S. Application Data

(60) Provisional application No. 61/784,168, filed on Mar. 14, 2013.

(51) Int. Cl.
*G06F 9/455* (2006.01)

(52) U.S. Cl.
CPC . *G06F 9/45558* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 8,171,201 B1* | 5/2012 | Edwards, Sr. | G06F 9/45558 711/112 |
| 8,583,852 B1* | 11/2013 | Mahajan | G06F 9/45558 711/161 |
| 2008/0022277 A1* | 1/2008 | Kano | G06F 3/0605 718/1 |
| 2010/0049929 A1* | 2/2010 | Nagarkar | G06F 9/45533 711/162 |
| 2011/0265076 A1* | 10/2011 | Thorat | G06F 8/65 717/172 |
| 2012/0266162 A1* | 10/2012 | Baron | G06F 9/45558 718/1 |
| 2013/0047160 A1* | 2/2013 | Conover | G06F 8/65 718/1 |
| 2013/0132942 A1* | 5/2013 | Wang | G06F 9/45504 717/176 |

* cited by examiner

Primary Examiner — Adam Lee (57) ABSTRACT

Examples disclosed herein provide systems, methods, and software for minimizing Small Computer System Interface (SCSI) limitations on virtual machines are disclosed herein. In one example, a method of operating a volume combining system to combine volumes for a virtual machine includes identifying two or more volumes to be attached to the virtual machine. The method further provides combining the two or more volumes into a single volume, and attaching the single volume to the virtual machine.

20 Claims, 6 Drawing Sheets

MINIMIZING SCSI LIMITATIONS FOR VIRTUAL MACHINES

This application hereby claims the benefit of and priority to U.S. Provisional Patent Application 61/784,168, titled "MINIMIZING SCSI LIMITATIONS FOR VIRTUAL MACHINES", filed Mar. 14, 2013, and which is hereby incorporated by reference in its entirety.

TECHNICAL BACKGROUND

A virtual machine is a virtualized copy of a computer system, with virtual hardware that includes a disk controller, a network card, and other similar devices. Frequently, running within the virtual machine is a full operating system, such as Linux or Microsoft Windows. These virtual machines run on a physical host server that includes a hypervisor, which abstracts the physical hardware of the host server allowing the virtual machine to see virtual hardware regardless of what the underlying hardware actually comprises.

Typically, virtual machines suffer from limitations on the number of Small Computer System Interface (SCSI) drives that can be attached to the virtual machines. This limitation is incurred by the hypervisor, which has limits on the number of buses that can be presented to the virtual machine. As a result, a virtual machine is limited to the number of drives that can be communicated over the predefined buses.

OVERVIEW

Methods, systems, and software for minimizing Small Computer System Interface (SCSI) limitations on virtual machines are disclosed herein. In a particular example, a method of operating a volume combining system to combine volumes for a virtual machine includes identifying two or more volumes to be attached to the virtual machine. The method further includes combining the two or more volumes into a single volume, and attaching the single volume to the virtual machine.

In another instance, a computer apparatus to combine volumes for a virtual machine includes processing instructions that direct a volume combining system to identify two or more volumes to be attached to the virtual machine. The processing instructions further direct the volume combining system to combine the two or more volumes into a single volume, and attach the single volume to the virtual machine. The computer apparatus further includes one or more non-transitory computer readable media that store the processing instructions.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DESCRIPTION

Virtual machines are a software implementation of a real machine that is capable of executing applications similar to the real machine. These virtual machines typically include a guest operating system, such as Linux or Microsoft Windows, and abstract the physical hardware resources of the host machine on which they are executing. To provide a virtual machine, a real or host machine, such as a server computer, desktop computer, laptop computer, or some other host computing device, includes a hypervisor. A hypervisor, or virtual machine monitor, is a piece of computer software, firmware, or other hardware that creates and executes virtual machines.

In some examples of hypervisors, the hypervisor may institute a limit on the number of Small Computer System Interface (SCSI) drives that can be connected to the virtual machine by limiting the buses for each virtual machine. Accordingly, a virtual machine may not be able to connect all of the disks or virtual hard disks that are necessary for the operation of the machine.

In the present example, virtual storage elements, such as virtual hard disks (VHDs), may be attached or mounted to the virtual machines to supply a variety of applications and processes to the machine. However, due to the limitations in the number of VHDs that can be connected, the virtual machine may not be able to attach all of the necessary applications. Accordingly, rather than connecting individually each of the VHDs that contain the applications, a volume combiner may be used that combines one or more of the application volumes into a single volume, such as a virtual machine disk (VMDK), and connects this single volume to the virtual machine. This volume combiner may reside on the host device, in the hypervisor, or on a separate distinct processing element.

Figure 1:
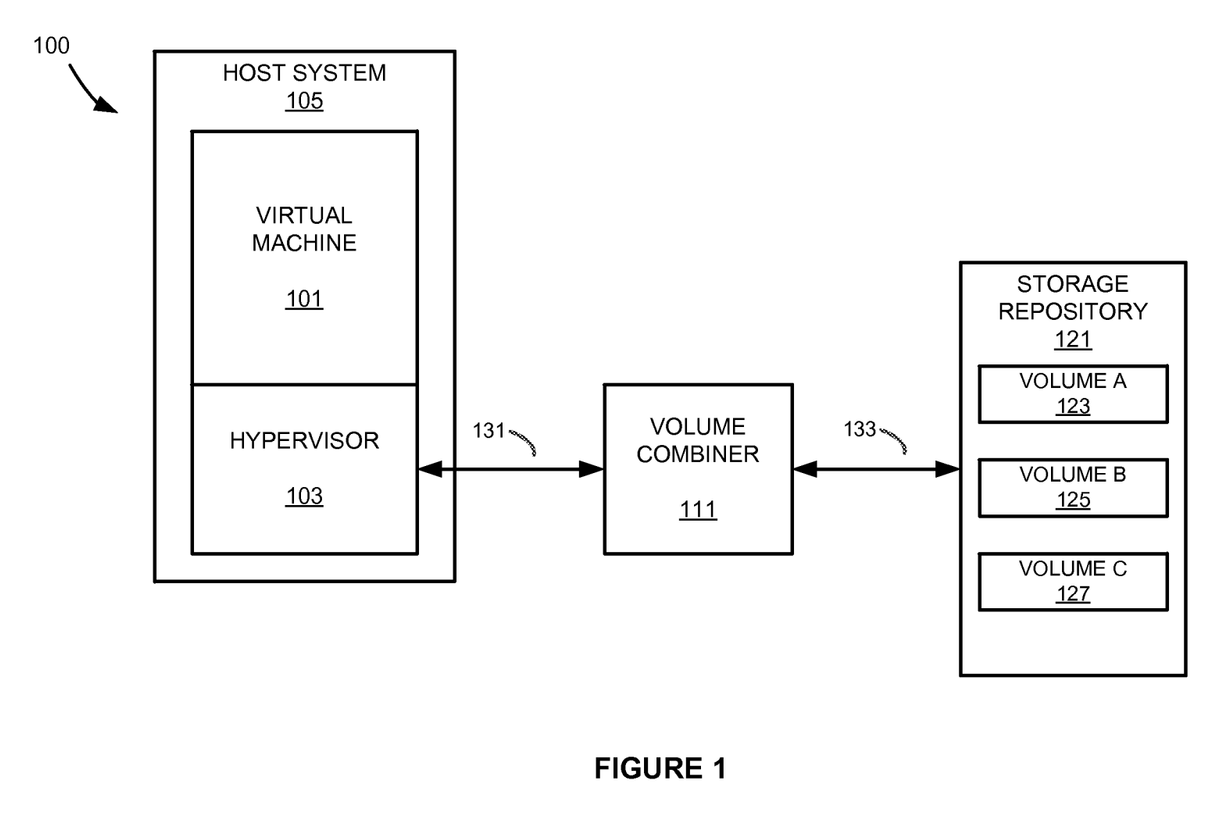
FIG. 1 illustrates a volume combining system according to one example.

To further illustrate the combining of volumes to avoid hypervisor SCSI limitations, FIG. 1 is included. FIG. 1 illustrates a volume combining system 100 according to one example. Volume combining system 100 includes virtual machine 101, hypervisor 103, host system 105, volume combiner 111, and storage repository 121. Storage repository 121 further includes volume A 123, volume B 125, and volume C 127, although further volumes may be stored on storage repository 121. Hypervisor 103 communicates with volume combiner 111 over communication link 131 and volume combiner 111 further communicates with storage repository 121 over communication link 133.

In operation, virtual machine 101 will operate on top of hypervisor 103, which is used to abstract the physical components of host system 105 and provide the abstracted components to virtual machine 101. Hypervisor 103 is a piece of computer software, firmware, or other hardware that creates and executes virtual machines on host system 105. Host system 105 may include processing systems, communication interfaces, user interfaces, storage systems, or any other computing system for providing virtual machines. Host system 105 may represent a server computer, desktop computer, laptop computer, or other similar computing element.

Storage repository 121 includes any device or combination of devices capable of storing volume A 123, volume B 125, and volume C 127. Examples of storage repository 121 can include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the volumes—including combinations thereof. In some examples, volumes 123, 125, and 127 may include virtual storage elements, such as virtual hard drives (VHDs). The VHDs contain what is found on a physical hard drive, such as disk partitions and a file system, which in turn can contain files and folders.

Volume combiner 111 can include one or more computer systems, custom hardware, or other devices capable of taking in two or more volumes from storage repository 121 and combining the two or more volumes into a combined volume. Volume combiner 111 may include processing systems, storage systems, communication interfaces, user interfaces, and other computing elements. Although illustrated separately, it should be understood that volume combiner 111 might be implemented wholly or partially on host system 105 or storage repository 121.

Communication links 131 and 133 use metal, glass, air, space, or some other material as the transport media. Communication links 131 and 133 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 131 and 133 could be direct links or may include intermediate networks, systems, or devices.

Figure 2:
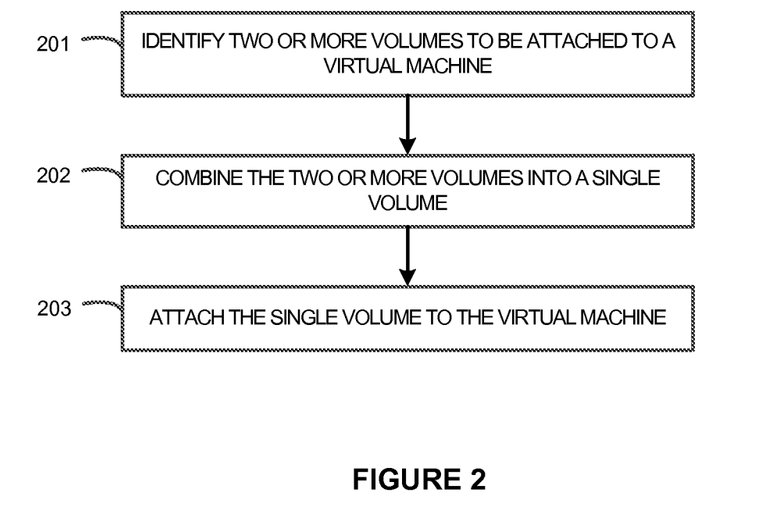
FIG. 2 illustrates a method for operating a volume combining system according to one example.

As a further illustration of the operation of volume combining system 100, FIG. 2 is included. FIG. 2 illustrates the operation of volume combining system 100 to provide combined volumes to virtual machine 101. The operation begins by identifying two or more volumes that need to be attached to virtual machine 101 (201). In some examples, the volumes could be identified prior to initiating virtual machine 101. For example, prior to initializing virtual machine 101, a user or some other service can specify that they would prefer volume A 123, volume B 125, and volume C 127 to be attached to virtual machine 101. In other examples, the volumes to attach could be identified during the operation of virtual machine 101. For example, while in operation a user or some other service on virtual machine 101 may require a plurality of applications, which reside on volume A 123, volume B 125, and volume C 127.

Following the identification of the volumes, volume combiner 111 will combine the two or more volumes into a single volume (202). In some examples, the two or more volumes may include virtual storage elements, such as VHDs, and the single volume may include a virtual machine disk (VMDK). The VMDK is a file format that is a container for VHDs to be used in virtual machines and may include a plurality of the virtual storage elements.

After combining the two or more volumes into a single volume, the single volume may then be attached to the virtual machine (203). The single volume may be attached to the virtual machine by mounting or mapping the drive. In some examples, the single combined volume may be stored in the storage repository. Thus, if another virtual machine needs the same volumes, a pre-combined volume will already be available in the form of the single volume.

Although illustrated with combining a plurality of storage volumes into a single volume, it should be understood that the plurality of virtual machines might be placed within a plurality of condensed storage volumes. These condensed storage volumes may decrease the number of busses that are required by the storage volumes attached to the virtual machine.

Figure 3:
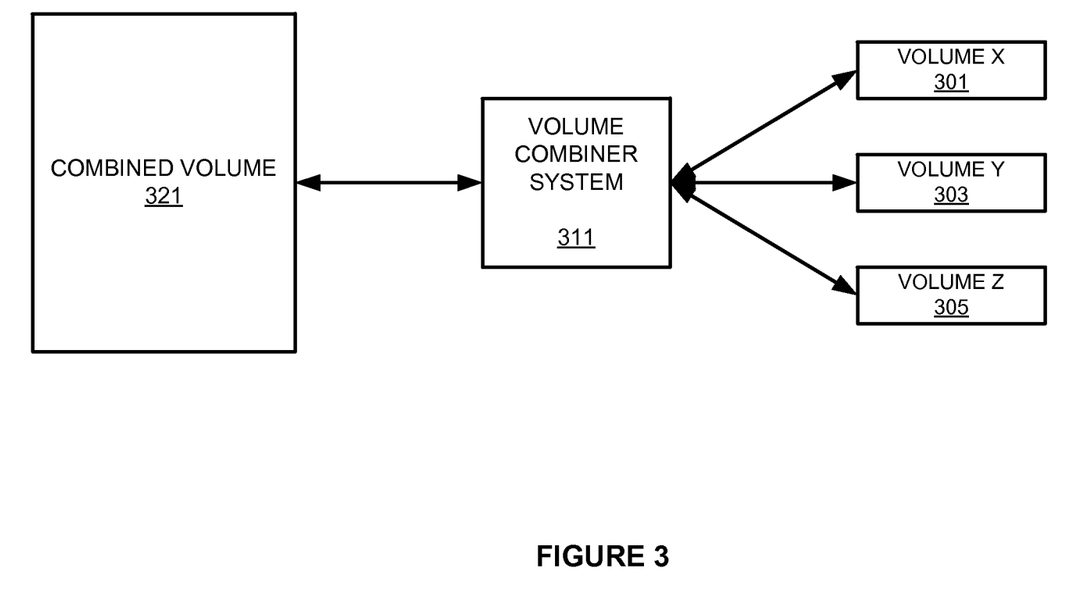
FIG. 3 illustrates an overview of volume combining according to one example.

FIG. 3 illustrates an overview of volume combining according to one example. The overview includes volume X 301, volume Y 303, volume Z 305, volume combiner system 311, and combined volume 321.

Volume X 301, volume Y 303, volume Z 305, and combined volume 321 may be stored in random access memory, read only memory, magnetic disks, optical disks, flash memory, virtual memory, and non-virtual memory, magnetic cassettes, magnetic tape, magnetic disk storage or other magnetic storage devices, or any other medium which can be used to store the volumes. In some examples volume X 301, volumes Y 303, and volume Z 305 may comprise virtual storage elements, such as VHDs, and combined volume may comprise a VMDK or other similar file structure.

Volume combiner system 311 can include one or more computer systems, custom hardware, or other devices capable of taking in two or more storage volumes and outputting a single volume. Volume combiner 311 may include processing systems, storage systems, communication interfaces, user interfaces, and other computing elements. Although illustrated as a separate system, it should be understood that volume combiner 111 might be implemented wholly or partially on the host system for the virtual machine.

In operation, a request will be made for two or more volumes to be attached to a virtual machine. This request could occur prior to initializing virtual machine or could occur during the execution of the virtual machine. In the present example, the volumes that are requested are volume X 301, volume Y 303, and volume Z 305. These volumes could be virtual hard drives (VHDs) or some other similar virtual element. Once the request has been identified, volume combiner system 311 will take in the three volumes to be attached, and combine the multiple volumes into a single volume, combined volume 321. Combined volume 321 may appear to the virtual machine as a single device, however, combined volume 321 will contain volume X 301, volume Y 303, and volume Z 305. In some examples, combined volume 321 may represent a VMDK that is a file format container for virtual hard drives that are used in virtual machines.

Figure 4:
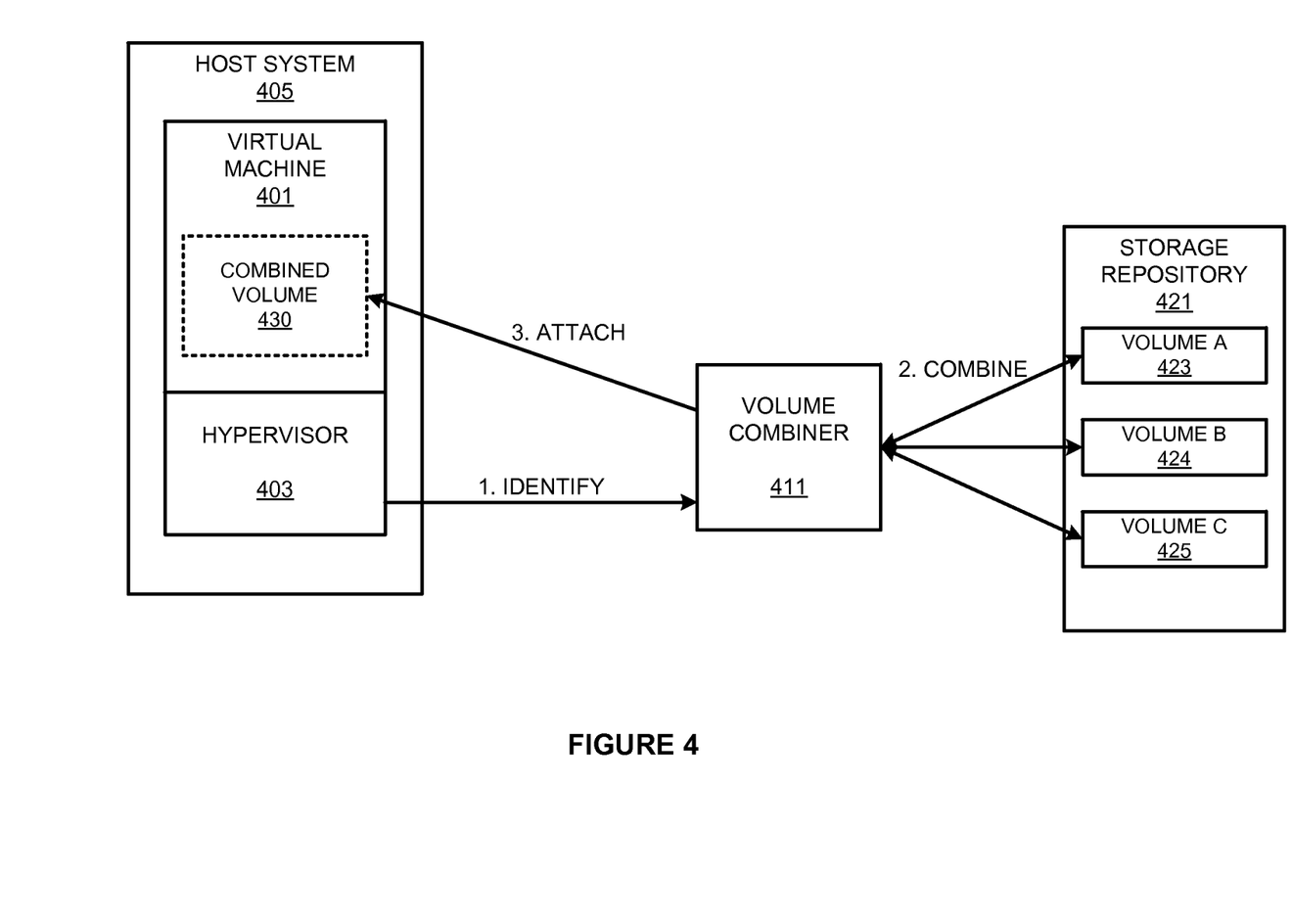
FIG. 4 illustrates an overview of operating a volume combining system according to one example.

FIG. 4 illustrates an overview of operating a volume combining system to provide combined volumes to a virtual machine. FIG. 4 includes host system 405, volume combiner 411, and storage repository 421. Host system 405 further includes virtual machine 401 and hypervisor 403. Storage repository 421 further includes volumes 423-425 although further volumes may be stored in storage repository 421. In some examples, volumes 423-425 may include applications suitable for execution with a virtual machine. Accordingly, when the volumes are attached or mounted to a virtual machine, the virtual machine may execute the applications without a full local installation.

In operation, virtual machine 401 is configured to execute on top of hypervisor 403. Hypervisor 403 abstracts the physical components of host system 405 and provides the abstracted components to virtual machine 401. Although illustrated with one virtual machine in the present example, it should be understood that hypervisor 403 might be used to operate a plurality of virtual machines by providing the necessary components for operation.

In the present example, hypervisor 403 or some other management component, such as volume combiner 411, is configured to identify that multiple volumes are necessary for the operation of virtual machine 401. This identification may occur before the initiation of the virtual machine or may occur during the execution of the virtual machine. Responsive to the identification, volume combiner 411 is configured to identify and combine the appropriate volumes into a single combined volume 430. Once combined, combined volume 430 is attached or mounted to virtual machine 401 without storing the data of the combined volume locally in virtual machine 401. In some examples, although not illustrated, combined volume 430 may be stored in storage repository 421. Accordingly, to attach or mount the combined volume, virtual machine 401 may be mapped or routed to the location of combined volume 430 in storage repository 421.

In examples, where the volumes to be attached are specified prior to the initiation of the virtual machine, the system is configured to initiate the virtual machine 401 with combined volume 430 already attached and available. Further, in situations where volumes 423-425 include applications, registry files and other registry information may be modified to make the applications immediately available upon startup and execution of the virtual machine.

Similarly, when the volumes to be attached are specified during the execution of the virtual machine, the system is configured to dynamically attach or map combined volume 430 to the executing virtual machine. Once attached, in examples where volumes 423-425 include applications, registry files and other registry information may be modified to make the applications available without installation.

Figure 5:
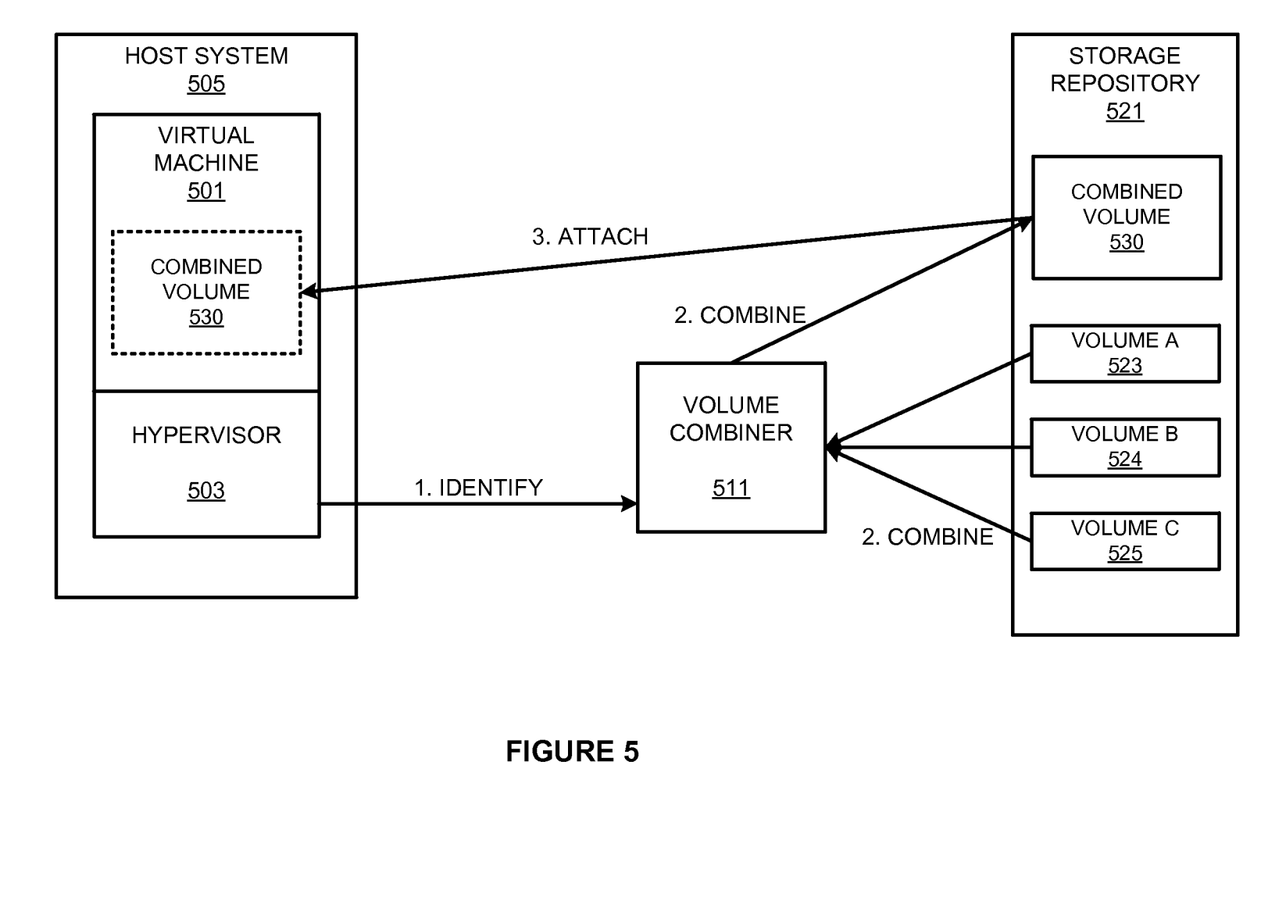
FIG. 5 illustrates an overview of operating a volume combining system according to one example.

FIG. 5 illustrates an overview of operating a volume combining system to provide combined volumes to a virtual machine. FIG. 5 includes host system 505, volume combiner 511, and storage repository 521. Host system 505 further includes virtual machine 501 and hypervisor 103. Storage repository 521 further includes volumes 523-525 although further volumes may be stored in storage repository 521. In some examples, volumes 523-525 may include applications suitable for execution with a virtual machine. Accordingly, when the volumes are attached or mounted to a virtual machine, the virtual machine may execute the applications without a full local installation.

In operation, virtual machine 501 is configured to execute on top of hypervisor 503. Hypervisor 503 abstracts the physical components of host system 505 and provides the abstracted components to virtual machine 501. Although illustrated with one virtual machine in the present example, it should be understood that hypervisor 503 might be used to operate a plurality of virtual machines by providing the necessary components for operation.

In the present example, hypervisor 503 or some other management component, such as volume combiner 511, is configured to identify that multiple volumes are necessary for the operation of virtual machine 501. This identification may occur before the initiation of the virtual machine or may occur during the execution of the virtual machine. Responsive to the identification, volume combiner 511 is configured to identify and combine the appropriate volumes into a single combined volume 530. Once combined, combined volume 530 may be stored in storage repository 521, and the stored volume may be attached, mapped, or mounted to virtual machine 521. This storage of the combined volume allows virtual machine 501 to access the contents of the volume without storing the data locally on the virtual machine. Further, by storing combined volume 530 in storage repository 521, other virtual machines may have access to the contents of combined volume 530.

In some examples, where the volumes to be attached are specified prior to the initiation of the virtual machine, the system is configured to initiate the virtual machine 501 with combined volume 530 already attached and available. Additionally, in situations where volumes 523-525 include applications, registry files and other registry information may be modified to make the applications immediately available upon startup and execution of the virtual machine.

Similarly, when the volumes to be attached are specified during the execution of the virtual machine, the system is configured to dynamically attach or map combined volume 530 to the executing virtual machine. Once attached, in examples where volumes 523-525 include applications, registry files and other registry information on the virtual machine may be modified to make the applications available without installation.

Figure 6:
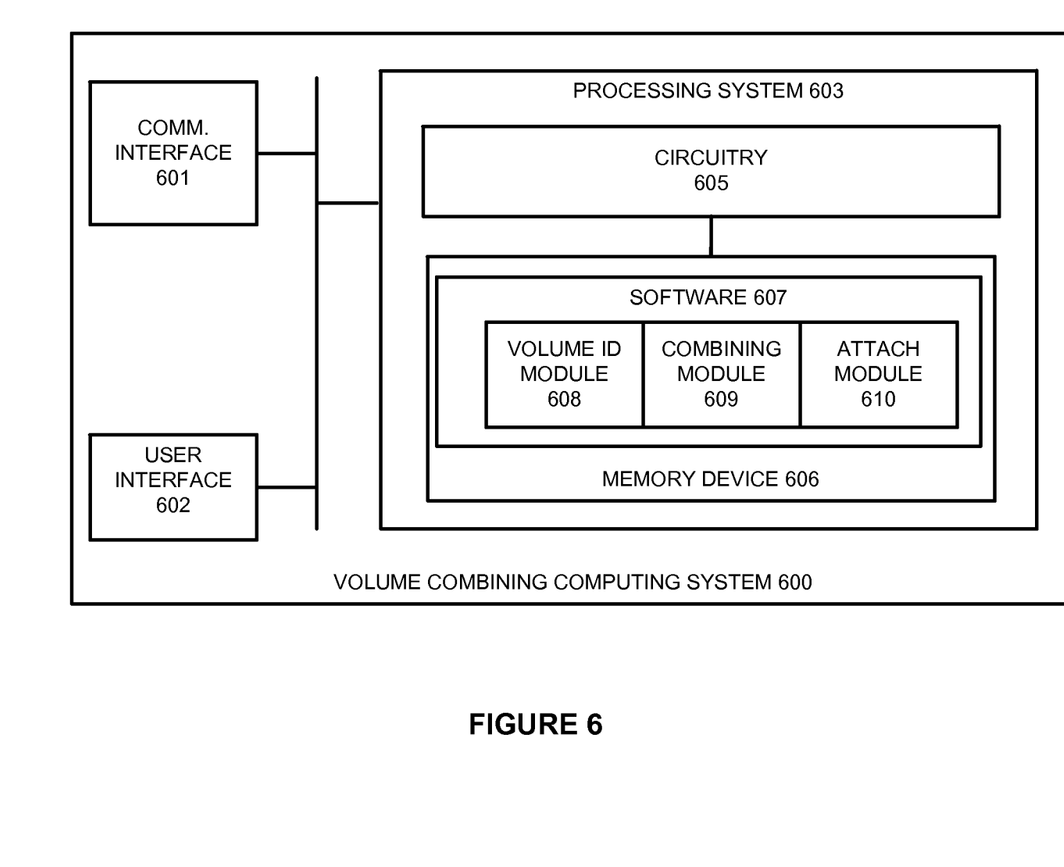
FIG. 6 illustrates a volume combining computing system according to one example.

FIG. 6 illustrates a volume combining computing system 600. Volume combining computing system 600 is an example of a computing system to implement volume combining system 100, although other examples may exist. Volume combining computing system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 includes volume identifier module 608, combining module 609, and attach module 610. Operating software 607 may further include an operating system, utilities, drivers, network interfaces, applications, hypervisors, or some other type of software. When executed by circuitry 605, operating software 607 directs processing system 603 to operate volume combining computing system 600 as described herein.

In a particular example, computing system 600 executes a hypervisor that provides a platform for one or more virtual machines. These virtual machines may be created for a variety of purposes, and as a result may require a variety data and applications. As a result, volume identifier module 608 is configured to identify two or more volumes to attach to a virtual machine. These two or more volumes may include virtual drive elements, such as virtual hard drives (VHDs), which require buses provided by the hypervisor for the virtual machine. Once the two or more volumes are identified, combining module 609 is configured to combine the two or more volumes into a combined volume, and attach module 610 is configured to attach the combined volume to the virtual machine. This combined volume may comprise a container file, such as a virtual machine disk (VMDK), which is capable of storing multiple drive elements to minimize the SCSI limitations implemented by the hypervisor providing the virtual machine.

In some instances, the identification of the two or more volumes may occur prior to the initiation of the virtual machine. As a result, the combined volume may be attached or mounted when the virtual machine initiates. In another occurrence, when the identification of the two or more volumes occurs during the execution of the virtual machine, the combined volume may be dynamically attached or mounted during the execution of the virtual machine.

In some examples, the two or more volumes are stored within a storage repository that could contain any number of volumes to be attached to virtual machines. These volumes may further include applications that are capable of execution upon attachment to the virtual machines. Accordingly, once the combined volume is attached, registry files and other registry information may be modified to make the applications within the volumes executable without local installation of the files on the virtual machine. Further, because the volumes are stored within a storage repository, the volumes and applications may be attached or mounted to multiple virtual machines. This allows the multiple virtual machines to have access to the same application without local installation on each of the machines.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a virtual volume combining system to combine virtual volumes for a virtual machine, the method comprising:
    identifying two or more virtual volumes to be attached to the virtual machine in response to a user request for the virtual machine;
    combining the two or more virtual volumes into a single virtual volume; and
    attaching the single virtual volume to the virtual machine by mounting the single virtual volume to the virtual machine and modifying registry information on the virtual machine to make at least one application stored on the single virtual volume executable by the virtual machine.

2. The method of claim 1 wherein each of the two or more virtual volumes includes one or more applications.

3. The method of claim 1 wherein the method further comprises: storing the single virtual volume in a storage repository.

4. The method of claim 1 wherein the two or more virtual volumes comprise two or more virtual hard disks (VHDs).

5. The method of claim 4 wherein the single virtual volume comprises a virtual machine disk (VMDK).

6. The method of claim 5 wherein combining the two or more virtual volumes into a single virtual volume comprises: generating the VMDK as a container for the two or more VHDs.

7. The method of claim 1 wherein the user request for the virtual machine comprises a request for the at least one application during execution of the virtual machine.

8. The method of claim 1 further comprising:
    receiving, prior to initiating the virtual machine, the user request, wherein the user request comprises a request for the at least one application; and
    initiating execution of the virtual machine.

9. The method of claim 1 wherein the user request for the virtual machine comprises a request for the two or more virtual volumes.

10. A computer apparatus to combine virtual volumes for a virtual machine, the computer apparatus comprising:
    processing instructions that direct a virtual volume combining system, when executed by the virtual volume combining system, to:
        identify two or more virtual volumes to be attached to the virtual machine in response to a user request for the virtual machine;
        combine the two or more virtual volumes into a single virtual volume; and
        attach the single virtual volume to the virtual machine by mounting the single virtual volume to the virtual machine and modifying registry information on the virtual machine to make at least one application stored on the single virtual volume executable by the virtual machine; and
    one or more non-transitory computer readable media that store the processing instructions.

11. The computer apparatus of claim 10 wherein each of the two or more virtual volumes includes one or more applications.

12. The computer apparatus of claim 10 wherein the processing instructions further direct the virtual volume combining system to store the single virtual volume in a storage repository.

13. The computer apparatus of claim 10 wherein the two or more virtual volumes comprise two or more virtual hard disks (VHDs).

14. The computer apparatus of claim 13 wherein the single virtual volume comprises a virtual machine disk (VMDK).

15. The computer apparatus of claim 14 wherein the processing instructions to combine the two or more virtual volumes into the single virtual volume direct the virtual volume combining system to generate the VMDK as a container for the two or more VHDs.

16. The computer apparatus of claim 10 wherein the user request for the virtual machine comprises a request for the at least one application during the execution of the virtual machine.

17. The computer apparatus of claim 16 wherein the processing instructions further direct the virtual volume combining system to:

receive, prior to initiating the virtual machine, the user request, wherein the user request comprises a request for the at least one application; and initiate execution of the virtual machine.

18. The computer apparatus of claim 10 wherein the processing instructions further direct the virtual volume combining system to execute the at least one application on the virtual machine.

19. An apparatus comprising:

one or more non-transitory computer readable storage media;

processing instructions stored on the one or more non-transitory computer readable storage media to operate a virtual volume combining service that, when read and executed by a processing system, direct the processing system to:

identify a request to attach two or more virtual volumes of a first virtual drive format to a virtual machine;

in response to identifying the request, combine the two or more virtual volumes into a single virtual volume of a second virtual drive format, wherein the second virtual drive format comprises a container file for the two or more virtual drives; and attach the single virtual volume to the virtual machine by mounting the single virtual volume to the virtual machine and modifying registry information on the virtual machine to make at least one application stored on the single virtual volume executable by the virtual machine.

20. The apparatus of claim 19 wherein the two or more virtual volumes comprise two or more virtual hard disks (VHDs) and the single virtual volume comprises a virtual machine disk (VMDK).

* * * * *